Sept. 5, 1944.　　　　C. H. HARRIS　　　　2,357,328
FILM WINDING MECHANISM.
Filed Oct. 3, 1941

INVENTOR.
Clinton H. Harris
BY
Bartholomew Diggins
Attorney

Patented Sept. 5, 1944

2,357,328

UNITED STATES PATENT OFFICE 2,357,328

FILM WINDING MECHANISM

Clinton H. Harris, Ann Arbor, Mich., assignor to Argus, Incorporated, a corporation of Michigan Application October 2, 1941, Serial No. 413,517

7 Claims. (Cl. 242—71)

The present invention relates to photographic cameras, and more particularly to a film winding mechanism therefor. One of the objects of the present invention is to provide a new and improved winding mechanism for photographic cameras which is simple and rugged in construction and efficient and convenient in operation. Another object is to provide a winding mechanism for photographic cameras in which the winding handle functions either as a knob or a swing type handle. A further object is to provide a winding mechanism for photographic cameras in which the winding handle folds into a flat and inconspicuous position on the camera. These and other objects and advantages reside in certain novel features of construction, arrangement and combination of parts, as will hereinafter be more fully set forth and pointed out in the appended claims.

Figure 1:
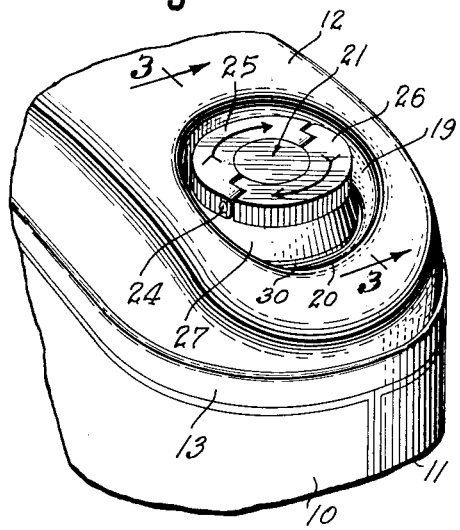
Fig. 1 is a fragmentary perspective view of the winding mechanism with the winding handles in folded position to be used as a knob.

A preferred embodiment of my invention is illustrated in the drawing wherein 10 designates the front and 11 the rear of a camera. This camera is provided with a top 12 having a flange 13 which overlies the back 11 of the camera to form a light cell. A wall 14 within the camera forms a chamber for a film spool 15 carrying the usual photographic film 16. This wall 14 is provided with an aperture 17 within which is fixed a bearing member 18. The top 12 of the camera has a recess or depression 19 terminating in a flat bottom wall portion 20 which rests on the upper surface of the bearing 18. A spindle 21 is journalled in the bearing 18 and extends into the spool chamber formed by the wall 14. The lower end of the spindle 21 is bifurcated as indicated at 22 to engage the film spool 15 for turning.

A flange 23 on the spindle 21 engages the inner surface of the wall 14 and prevents withdrawal of the spindle through the aperture 17. A pin 24 extends diametrically through the spindle 21 at its outer end and two substantially identical arcuate handles 25 and 26 extend around opposite sides of the spindle 21 and are pivotally secured on the pin 24.

A collar 27 having a flat top 28 and a central aperture 29 is slideable on the spindle 21 between the wall portion 20 and the handles 25 and 26. A flat washer 30 having a central aperture 31 encircles the spindle 21 and rests against the wall portion 20. A helical spring 32 encircles the spindle 21 between the washer 30 and the collar 27 and urges the collar upward against the handles 25 and 26. The handles 25 and 26 are substantially rectangular in cross section and their pivoted ends are flattened as indicated at 33.

Figure 2:
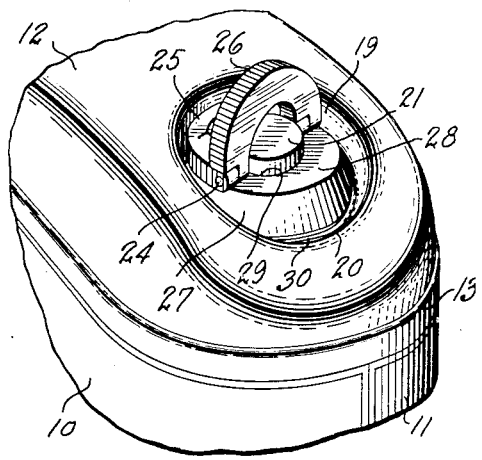
Fig. 2 is a view similar to Fig. 1 with the winding handle in the upright position.
Figure 3:
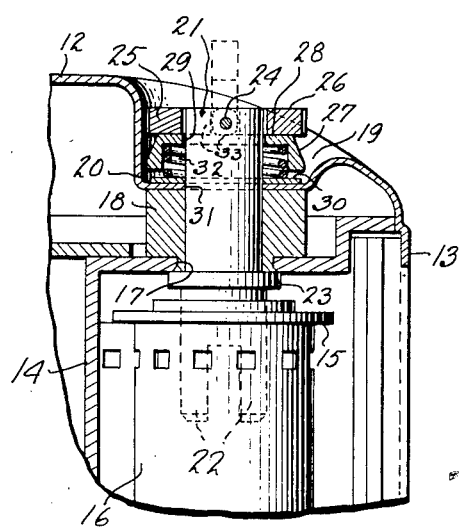
Fig. 3 is a fragmentary vertical section of the winding mechanism.
Figure 4:
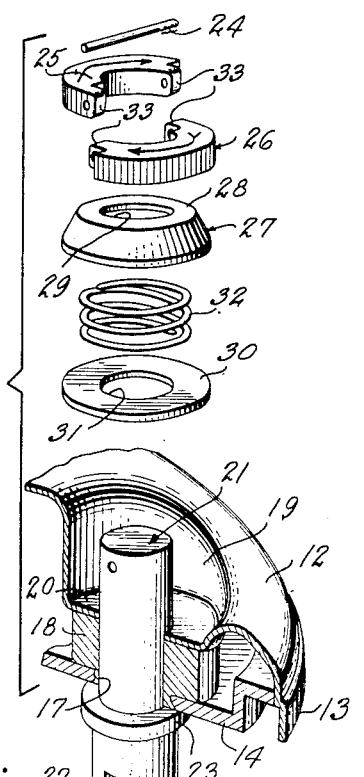
Fig. 4 is an exploded view of the winding mechanism.

The pressure of the flat surface 28 of the collar 27 urged upward by the spring 32 engages either the flat sides of the handles 25 and 26 or the flattened end portions 33 to hold these handles either in the flattened position shown in Figs. 1 and 3, or in the position shown in Fig. 2. With the handles 25 and 26 in the position shown in Figs. 1 and 3, the spindle 21 may be turned by the knurled outer edge of the handles. In this position the two handles function as a knob. In the position shown in Fig. 2 and shown in dotted lines in Fig. 3, the handle 26 may be grasped with the thumb and finger and is thus somewhat easier to turn.

From the foregoing, it will be apparent that I am able to attain the objects of my invention and provide a simple and inexpensive film winding mechanism for cameras in which the winding handle may be adjusted and maintained in either of two convenient positions. Various modifications in details of structure can of course be made without departing from the spirit of my invention or the scope of the appended claims.

I claim:

1. A winding mechanism for a camera having a wall provided with an opening, said winding mechanism comprising a winding shaft extending through said opening and rotatable therein, means for preventing withdrawal of said spindle from said wall, a handle, means pivotally securing said handle to said shaft, a slidable collar surrounding said shaft between said handle and said wall, resilient means for urging said collar into frictional engagement with said handle, and cooperating formations on said handle and resiliently urged collar for maintaining said handle in either of two predetermined pivotal positions on said shaft.

2. In a camera having an apertured bearing in one wall, a winding shaft journalled in said bearing, a flange on said shaft inside said camera for engaging the inner surface of said wall, a pin extending diametrically through said shaft outside said camera, a pair of similar arcuate handles extending around opposite sides of said shaft and pivotally mounted on said pin, the pivoted ends of said handles being flattened, a collar surrounding said shaft between the handles and the wall of the camera, and a coil spring surrounding said shaft for urging said collar into contact with said handles.

3. In a camera having a film spool chamber provided with a wall having an aperture therein, a spindle journalled in said aperture in said wall and extending into said chamber to engage a film spool therein, means for preventing withdrawal of said spindle from said wall, a pair of substantially identical arcuate handles extending around opposite sides of said spindle and pivotally secured on said spindle, the adjacent pivoted ends of said handles being flattened, a collar having a substantially flat top slideably mounted on said spindle between said handles and said wall and spring means for pressing the flat top of said collar against the flattened end of whichever of said handles is in upright position.

4. In a camera, a wall having an aperture, a rotatable spindle extending through said aperture and means preventing withdrawal of said spindle through said aperture, a collar having a substantially flat top surface slidable on said shaft, a handle pivoted to said shaft formed with a flat side face adjacent the collar and a flat end face adjacent the pivot, and a spring reacting between said wall and said collar for urging the flat top surface of said collar against either of the flat faces on said handle depending upon the pivotal position of said handle, so as to frictionally hold said handle in either of two pivotal positions.

5. In a camera, a wall formed with an apertured depression, a rotatable film spool spindle shaft extending through the aperture in said depression, means preventing axial withdrawal of said shaft outwardly through said aperture, a slidable collar on said shaft, a spring surrounding said shaft extending between the bottom of said depression and said collar, and a handle pivoted to the outer end of said shaft, said handle being foldable to an inconspicuous position substantially within said depression or swingable into an upright winding position projecting from said depression and being maintained in either of said positions by said spring and collar.

6. In a camera, a wall formed with a depression, the bottom of said depression being formed with an aperture, a rotatably mounted film spool support shaft extending through said aperture, a flange on said shaft engaging a fixed part on said camera for preventing withdrawal of said shaft through said aperture, a spring surrounding said shaft within said depression, a slidable collar on said shaft housing said spring, and a pivoted handle on said shaft beyond said collar, said handle being foldable to an inconspicuous position substantially within said recess or swingable into upright winding position projecting from said depression, and said spring reacting against the camera to force said collar against the handle to frictionally retain the latter in either position.

7. In a camera, a wall having an opening, a rotatable spindle extending through said opening to the exterior of the camera, a pair of arcuate handles pivoted on the projecting external end of said spindle for limited independent rocking movement about a common axis disposed normal to the axis of said spindle spaced outwardly from said wall, said handles each being rockable over the end of said spindle into an operative spindle winding position and embodying interengageable means for preventing said handles from being rocked into operative position simultaneously, a resilient pressure device surrounding said spindle intermediate said wall and said handles and exerting axially directed forces against the latter, said handles having faces coacting with said pressure device for causing said handles to be normally retained in folded inoperative position normal to the spindle and also being operable to retain either of said handles in operative position, at right angles to said folded position, said pressure device constantly urging said spindle outwardly, and means for limiting outward movement of said spindle.

CLINTON H. HARRIS.